(12) United States Patent
Li et al.

(10) Patent No.: US 12,664,411 B2
(45) Date of Patent: Jun. 23, 2026

(54) ACCELERATE NEURAL NETWORKS WITH COMPRESSION AT DIFFERENT LEVELS

(71) Applicant: Samsung Electronics Co., Ltd., Suwon-si (KR)

(72) Inventors: Ling Li, Sunnyvale, CA (US); Ali Shafiee Ardestani, Santa Clara, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 1194 days.

(21) Appl. No.: 17/578,428

(22) Filed: Jan. 18, 2022

(65) Prior Publication Data

US 2023/0153586 A1    May 18, 2023

Related U.S. Application Data

(60) Provisional application No. 63/280,120, filed on Nov. 16, 2021.

(51) Int. Cl.
| | |
|---|---|
| *G06N 3/063* | (2023.01) |
| *G06F 5/01* | (2006.01) |
| *G06F 7/544* | (2006.01) |

(52) U.S. Cl.
CPC ............... *G06N 3/063* (2013.01); *G06F 5/01* (2013.01); *G06F 7/5443* (2013.01)

(58) Field of Classification Search
CPC ........ G06F 17/153; G06F 17/16; G06F 7/487; G06F 7/5443; G06F 7/523; G06F 5/01; G06N 3/0495
See application file for complete search history.

(56) References Cited

U.S. PATENT DOCUMENTS

| | | | |
|---|---|---|---|
| 4,594,679 | A | 6/1986 | George et al. |
| 5,042,001 | A | 8/1991 | Brightman et al. |

(Continued)

FOREIGN PATENT DOCUMENTS

| | | |
|---|---|---|
| CN | 107862374 A | 3/2018 |
| CN | 111767025 A | 10/2020 |

(Continued)

OTHER PUBLICATIONS

H. Abdel-Aziz et al., Rethinking Floating Point Overheads for Mixed Precision DNN Accelerators, Proceedings of the 4th MLSys Conference 2021 (Year: 2021).*

(Continued)

*Primary Examiner* — Emily E Larocque
(74) *Attorney, Agent, or Firm* — Renaissance IP Law Group LLP

(57)    ABSTRACT

A neural network accelerator includes $2^n$ multiplier circuits, $2^n$ shifter circuits and an adder tree circuit. Each respective multiplier circuit multiplies a first value by a second value to output a first product value. Each respective first value is represented by a first predetermined number of bits beginning at a most significant bit of the first value having a value equal to 1. Each respective second value is represented by a second predetermined number of bits, and each respective first product value is represented by a third predetermined number of bits. Each respective shifter circuit receives the first product value of a corresponding multiplier circuit and left shifts the corresponding product value by the first predetermined number of bits to form a respective second product value. The adder circuit adds each respective second product value to form a partial-sum value represented by a fourth predetermined number of bits.

20 Claims, 6 Drawing Sheets

(56)                References Cited

U.S. PATENT DOCUMENTS

| | | | |
|---|---|---|---|
| 5,053,631 | A | 10/1991 | Perlman et al. |
| 5,131,072 | A | 7/1992 | Yoshizawa et al. |
| 5,144,576 | A | 9/1992 | Briggs et al. |
| 6,434,585 | B2 | 8/2002 | McGregor et al. |
| 6,539,368 | B1 | 3/2003 | Chernikov et al. |
| 6,820,105 | B2 | 11/2004 | Blaker |
| 7,240,184 | B2 | 7/2007 | Siu et al. |
| 7,689,639 | B2 | 3/2010 | Dent |
| 7,885,992 | B2 | 2/2011 | Richey et al. |
| 8,073,892 | B2 | 12/2011 | Feghali et al. |
| 8,443,019 | B2 | 5/2013 | Kopp |
| 10,228,911 | B2 | 3/2019 | Henry et al. |
| 10,387,122 | B1 | 8/2019 | Olsen |
| 10,417,560 | B2 | 9/2019 | Henry et al. |
| 10,515,302 | B2 | 12/2019 | Henry et al. |
| 10,565,494 | B2 | 2/2020 | Henry et al. |
| 10,621,489 | B2 | 4/2020 | Appuswamy et al. |
| 10,664,751 | B2 | 5/2020 | Henry et al. |
| 2016/0041813 | A1* | 2/2016 | Narayanamoorthy ....................... G06F 1/3243 708/190 |
| 2018/0218275 | A1 | 8/2018 | Arrigoni et al. |
| 2020/0160159 | A1 | 5/2020 | Azari et al. |
| 2020/0167632 | A1 | 5/2020 | Kim et al. |
| 2020/0201602 | A1 | 6/2020 | Felix et al. |
| 2020/0210840 | A1 | 7/2020 | Rouhani et al. |
| 2021/0042089 | A1 | 2/2021 | Sasan et al. |
| 2021/0103799 | A1* | 4/2021 | Venkataramani ...... G06N 3/048 |
| 2021/0125046 | A1 | 4/2021 | Moshovos et al. |
| 2021/0182024 | A1 | 6/2021 | Mueller et al. |
| 2021/0208881 | A1 | 7/2021 | Song |
| 2021/0263993 | A1 | 8/2021 | Urbanski et al. |
| 2022/0067530 | A1* | 3/2022 | Khailany ............... G06N 3/063 |
| 2023/0267313 | A1* | 8/2023 | Kim ..................... G06N 3/0464 706/27 |

FOREIGN PATENT DOCUMENTS

| | | |
|---|---|---|
| CN | 111832719 A | 10/2020 |
| EP | 1025485 A2 | 8/2000 |
| WO | 2021023482 A1 | 2/2021 |

OTHER PUBLICATIONS

Erle, Mark A. et al., "Decimal Floating-Point Multiplication," IEEE Transactions on Computers, vol. 58, No. 7, 2009, pp. 902-916.

Hickmann, Brian et al., "A Parallel IEEE P754 Decimal Floating-Point Multiplier," 2007 25th International Conference on Computer Design, 2007, pp. 296-303.

Judd, Patrick et al., "Stripes: Bit-Serial Deep Neural Network Computing," 2016 49th Annual IEEE/ACM International Symposium on Microarchitecture (MICRO), 2016, 12 pages.

Pradhan, Manoranjan et al., "Speed Comparison of 16×16 Vedic Multipliers," International Journal of Computer Applications, vol. 21, No. 6, 2011, pp. 16-19.

Tong, Jonathan Ying Fai et al., "Reducing Power by Optimizing the Necessary Precision/Range of Floating-Point Arithmetic," IEEE Transactions on Very Large Scale Integration (VLSI) Systems, vol. 8, No. 3, 2000, pp. 273-286.

* cited by examiner

ACCELERATE NEURAL NETWORKS WITH COMPRESSION AT DIFFERENT LEVELS

CROSS-REFERENCE TO RELATED APPLICATION

This application claims the priority benefit under 35 U.S.C. § 119 (e) of U.S. Provisional Application No. 63/280, 120, filed on Nov. 16, 2021, the disclosure of which is incorporated herein by reference in its entirety.

TECHNICAL FIELD

The subject matter disclosed herein relates to data compression. More particularly, the subject matter disclosed here relates to techniques for applying data compression (truncation) at different locations within a neural network accelerator.

BACKGROUND

Image classification models, such as ResNet50 and MobileNet v2, preserve the top-1 accuracy by using a partial sum (PSUM) compression (truncation) because there is an abundance of superfluity in the partial sums. For example, partial-sum truncation is used by only keeping the most significant 8 bits of the partial sum.

SUMMARY

An example embodiment provides a neural network accelerator that may include $2^n$ multiplier circuits, $2^n$ shifter circuits, and an adder circuit. Each respective multiplier circuit may be configured to multiply a corresponding first value by a corresponding second value to output a corresponding first product value in which n may be an integer. Each respective first value may be represented by a first predetermined number of bits beginning at a most significant bit of the first value having a value equal to 1. Each respective second value may be represented by a second predetermined number of bits, and each respective first product value may be represented by a third predetermined number of bits. Each respective shifter circuit may be configured to receive the first product value of a corresponding multiplier circuit and to left shift the corresponding product value by the first predetermined number of bits to form a respective second product value. The adder circuit may be configured to add each respective second product value to form a partial-sum value represented by a fourth predetermined number of bits. In one embodiment, each respective second value may be further represented by the second predetermined number of bits beginning at a most significant bit of the second value having a value equal to 1, and each respective shifter circuit may be further configured to left shift the corresponding product value by the first predetermined number plus the second predetermined number to form the respective second product value. In another embodiment, n equals 5, the first predetermined number of bits equals 4 bits, the second predetermined number of bits equals 4 bits, the third predetermined number of bits equals 8 bits, and the fourth predetermined number of bits equals 21 bits. In still another embodiment, n equals 5, the first predetermined number of bits equals 4 bits, the second predetermined number of bits equals 8 bits, the third predetermined number of bits equals 12 bits, and the fourth predetermined number of bits equals 21 bits. In yet another embodiment, the neural network accelerator may further include an accumulator configured to accumulate the partial-sum value with other partial-sum values to form a final sum value.

An example embodiment provides a neural network accelerator that may include $2^n$ multiplier circuits, and a first adder circuit. Each respective multiplier circuit may be configured to multiply a corresponding first value by a corresponding second value to output a corresponding product value in which n may be an integer. Each respective first value may be represented by a first predetermined number of bits. Each respective second value may be represented by a second predetermined number of bits and each respective product value may be represented by a third predetermined number of bits. Each multiplier circuit may be further configured to keep a fourth predetermined number of most significant bits of each respective product value in which the fourth predetermined number of bits may be less than the third predetermined number of bits. The first adder circuit may be configured to add product values output from the $2^n$ multiplier circuits to form a partial-sum value represented by a fifth predetermined number of bits. In one embodiment, n equals 5, the first predetermined number of bits equals 8 bits, the second predetermined number of bits equals 8 bits, the third predetermined number of bits equals 16 bits, the fourth predetermined number of bits equals 12 bits, and the fifth predetermined number of bits equals 17 bits. In another embodiment, the neural network accelerator may further include an accumulator configured to accumulate the partial-sum value with other partial-sum values to form a final sum value, and a second adder circuit configured to concatenate a sixth predetermined number of bits as least significant bits to the final sum value. In still another embodiment, the sixth predetermined number of bits equals 4 bits.

An example embodiment provides a neural network accelerator that may include $2^n$ multiplier circuits, an adder circuit, a partial truncation and encoding circuit, and a storage. Each respective multiplier circuit being configured to multiply a corresponding first value by a corresponding second value to output a corresponding product value in which n may be an integer. Each respective first value may be represented by a first predetermined number of bits. Each respective second value may be represented by a second predetermined number of bits and each respective product value may be represented by a third predetermined number of bits. The adder circuit may be configured to add product values output from the $2^n$ multiplier circuits to form a partial-sum value represented by a fourth predetermined number of bits. The partial truncation and encoding circuit may be configured to keep a fifth predetermined number of bits of each respective partial-sum value beginning at a most significant bit of the partial-sum value a value equal to 1. The storage may be configured to store each respective partial-sum value having the fifth predetermined number of bits. In one embodiment, the neural network accelerator may further include a shifter that may be configured to output each respective partial-sum value left shifted by a seventh predetermined number of bits, and an accumulator that may be configured to accumulate each respective partial sum value output from the shifter with other left-shifted partial-sum values to form a final sum. In another embodiment, n equals 5, the first predetermined number of bits equals 8 bits, the second predetermined number of bits equals 8 bits, the third predetermined number of bits equals 16 bits, the fourth predetermined number of bits equals 21 bits, and the fifth predetermined number of bits equals 8 bits.

BRIEF DESCRIPTION OF THE DRAWING

In the following section, the aspects of the subject matter disclosed herein will be described with reference to exemplary embodiments illustrated in the figure, in which.

DETAILED DESCRIPTION

Figure 1:
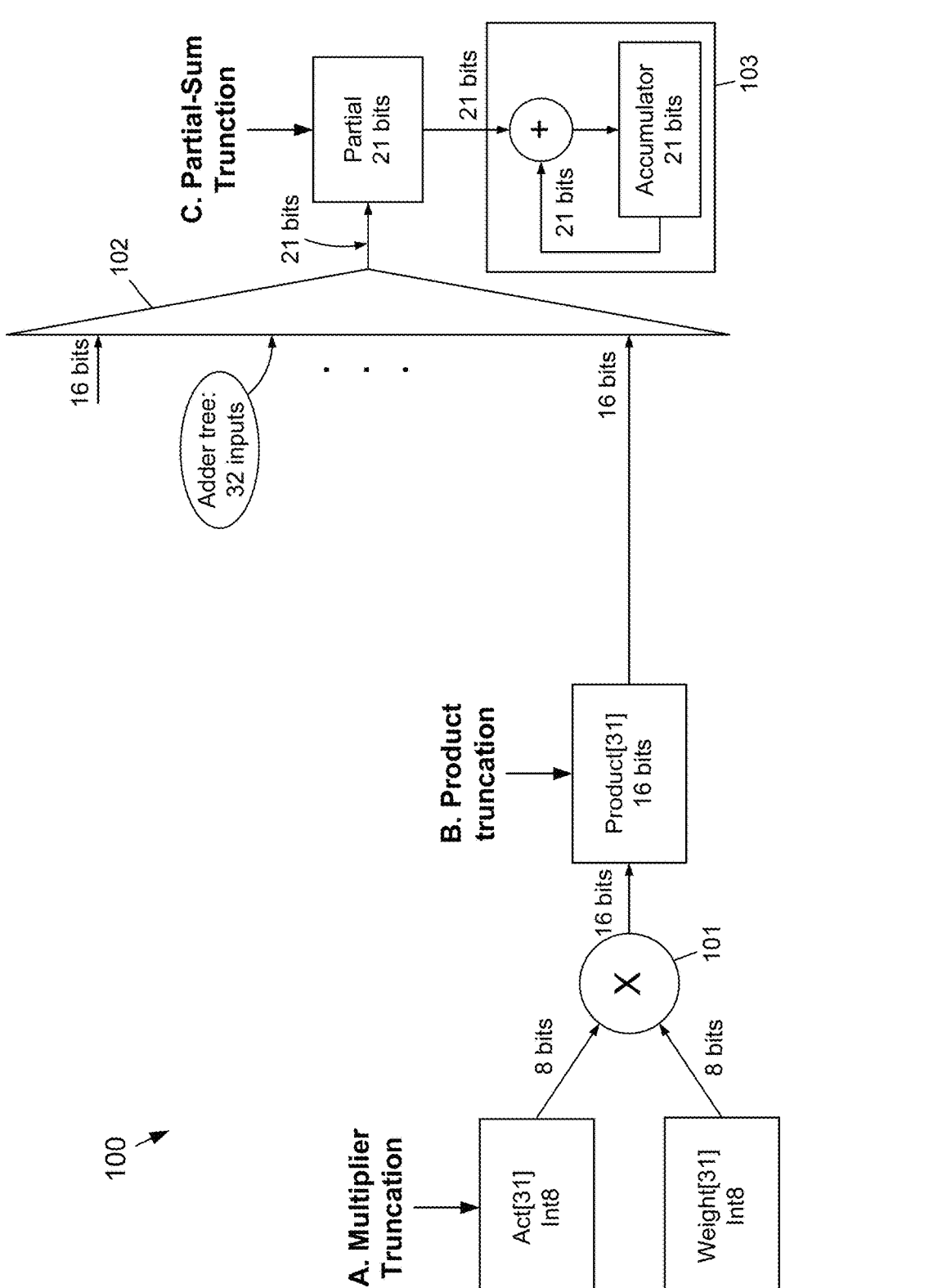
FIG. 1 depicts a portion of an example embodiment of a neural network accelerator.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined." "pixel-specific," etc.) may be occasionally interchangeably used with a corresponding non-hyphenated version (e.g., "two dimensional," "predetermined." "pixel specific," etc.), and a capitalized entry (e.g., "Counter Clock," "Row Select." "PIXOUT." etc.) may be interchangeably used with a corresponding non-capitalized version (e.g., "counter clock," "row select," "pixout." etc.).

Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and case of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first." "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

The subject matter disclosed herein uses partial compression (truncation) at different locations in a neural network accelerator to provide different performance tradeoffs, such as simplifying computation, reducing a critical datapath size (width) and/or a reducing a memory storage footprint size. In one embodiment, the subject matter disclosed herein truncates data at the inputs of a multiplier to simplify computation. In another embodiment, the subject matter truncates data at the output of a multiplier to reduce the size (width) of a critical data path. In still another embodiment, the subject matter disclosed herein truncates partial-sum data to reduce a memory footprint size.

FIG. 1 depicts a portion of an example embodiment of a neural network accelerator 100. The example embodiment neural network accelerator 100 may include 32 multipliers $101_0$-$101_{31}$, an adder tree 102 and an accumulator 103. Alternative embodiments may include other numbers of multipliers 101 and an adder tree that corresponds to the different number of multipliers. Each multiplier 101 may receive an activation value and a weight value as inputs. Each activation value and each weight value may be represented by, for example, an 8-bit value, in which case each multiplier 101 outputs a 16-bit product value. The adder tree 102 receives and sums the 32 product values and outputs a partial sum that may be a 21-bit value. The accumulator 103 receives and sums each partial-sum value with other partials sums to form a final accumulated value. The various components of the portion of an example embodiment of a neural network accelerator 100 may be formed by and/or controlled by one or more modules.

According to the subject matter disclosed herein, partial compression (i.e., truncation) may be applied at different locations in the example neural network accelerator 100 to obtain different benefits. For example, partial compression may be applied at an input to a multiplier, as indicated at A. That is, activations and/or weight values may be truncated from, for example, 8 bits to be 4 bits (or fewer). At B, the product values at the output of a multiplier may be truncated from, for example, 16 bits to be 12 bits (or fewer). At C, truncation may be applied at the output of an adder tree to reduce the partial sums from 32 bits (or 21 bits) may be truncated to be 8 bits (or fewer).

A benefit when truncation is applied at A at the input to a multiplier 101 may include a simpler computation, i.e., an 8×8 multiplication may be changed into a 4×4 multiplication at a price of reduced computational precision. When truncation is applied at B at the output of a multiplier 101, a benefit that may be obtained may include a smaller (i.e., narrower) critical datapath, i.e., 16 bits to 12 bits at a price of reduced data precision. When truncation is applied at C, a benefit that may be obtained may include a smaller memory storage for PSUMs. In some cases, a truncation technique and location may also include a small increase in overhead, such as a shifter and an encoder.

Figure 2:
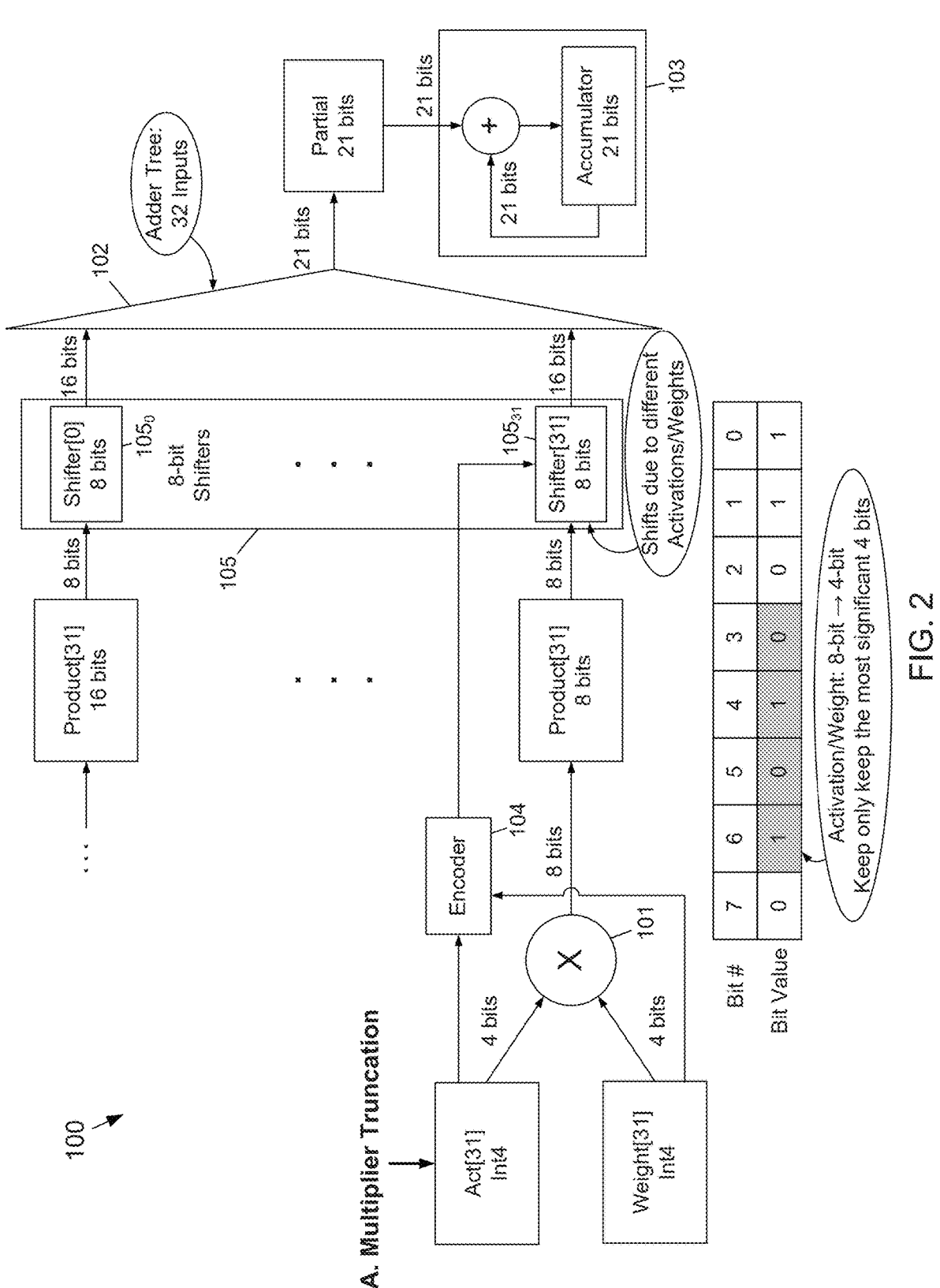
FIG. 2 depicts the portion of the example embodiment of the neural network accelerator in which data truncation (Multiplier Truncation) is applied at the inputs of a multiplier according to the subject disclosed herein.

FIG. 2 depicts the portion of the example embodiment of the neural network accelerator 100 in which data truncation (Multiplier Truncation) is applied at the inputs of a multiplier according to the subject disclosed herein. For Multiplier Truncation, the input values to a multiplier 101 may be truncated keeping the most significant bits of both the activation and the weight values. For example, if both the activation and the weight data are 8-bit values that are truncated to be 4-bit values, a multiplication computational savings results from a simplification of an 8×8 multiplication to be a 4×4 multiplication. The output width of the multiplier 101 is also reduced from a 16-bit product to an 8-bit product, which also provides a narrower data path between the multipliers 101 and the adder tree 102. As a typical neural network accelerator includes many multipliers (i.e., 32), reducing the width of the data path reduces the number of conductors, or wires, between the multipliers and the adder tree by 256 conductors, which may be a significant space savings.

An example 8-bit activation (or weight) value is shown at the bottom of FIG. 2. The 8-bit activation and weight values are truncated to keep the four most-significant bits. The four bits that are kept depends on the position of the most significant bit of the activation (or weight) value. The four most-significant bits of the example 8-bit value are in bits 6 to 3, so the bits that are kept begin at bit 6. Other activation and weight values may have the most significant bit in any of the bit positions.

To compensate for the reduced bit size (i.e., a reduced absolute magnitude value) of the product values resulting from truncation of the activation and weight values, an encoder 104 is coupled to the inputs of the multiplier 101 and an 8-bit shifter 105 is coupled to the output of each multiplier 101. The encoder 104 counts, or keeps track of, the number of least-significant bits truncated from both the activation value and the weight value. An output of the encoder 104 is coupled to the shifter 105 that left shifts a multiplier product value by the total number of least-significant bits truncated from both the corresponding activation and weight values. The left shifts provided by a shifter 105 restores a product value to 16 bits, which is then input to the adder tree 102.

Figure 3:
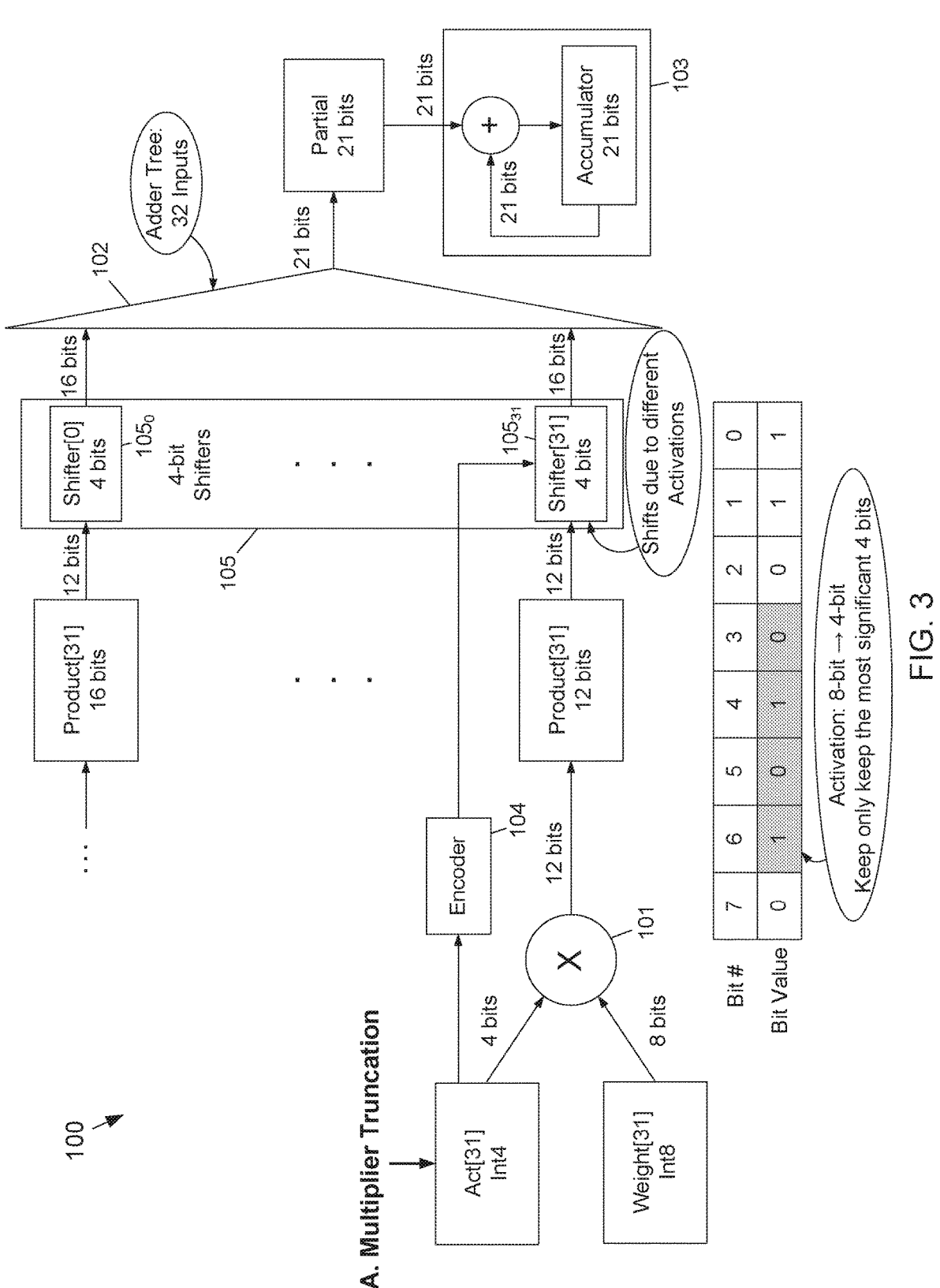
FIG. 3 depicts the portion of the example embodiment of the neural network accelerator in which data truncation (Multiplier Truncation) is applied at the activation input of a multiplier according to the subject disclosed herein.

FIG. 3 depicts the portion of the example embodiment of the neural network accelerator 100 in which data truncation (Multiplier Truncation) is applied at the activation input of a multiplier according to the subject disclosed herein. For Multiplier Truncation, the activation value input to a multiplier 101 is truncated to keep the most significant bits of the activation value, while weight values remain untruncated. (Alternatively, weight values may be truncated, while activation values may remain untruncated.) For example, if the activation data is an 8-bit value that is truncated to be a 4-bit value, a multiplication computation savings results from a simplification of an 8×8 multiplication to be a 4×8 multiplication. The output of the multiplier 101 is also reduced from a 16-bit product to a 12-bit product, thereby also providing a narrower data path between the multipliers 101 and the adder tree 102. For this example truncation embodiment, reducing the width of the data path between each multiplier and the adder tree reduces the number of conductors, or wires, between the multipliers and the adder tree by 128 conductors, which may be a significant space savings.

An example 8-bit activation (or weight) value is shown at the bottom of FIG. 2. The 8-bit activation is truncated to keep the four most-significant bits. The four bits that are kept depends on the position of the most significant bit of the activation (or weight) value. The four most-significant bits of the example 8-bit value are in bits 6 to 3, so the bits that are kept begin at bit 6. Other activation values may have the most significant bit in any of the bit positions.

To compensate for the reduced bit size (i.e., a reduced absolute magnitude value) of the product value as a result of the truncation of the activation value, an encoder 104 is coupled to the inputs of the multiplier 101 and an 4-bit shifter 105 is coupled to the output of each multiplier 101. The encoder 104 counts, or keeps track of, the number of least-significant bits truncated from the activation value. An output of the encoder 104 is coupled to the shifter 105 that left shifts a multiplier product value by the total number of least-significant bits truncated from the corresponding activation value. The left shifts provided by a shifter 105 restores a product value to 16 bits, which is then input to the adder tree 102.

Figure 4:
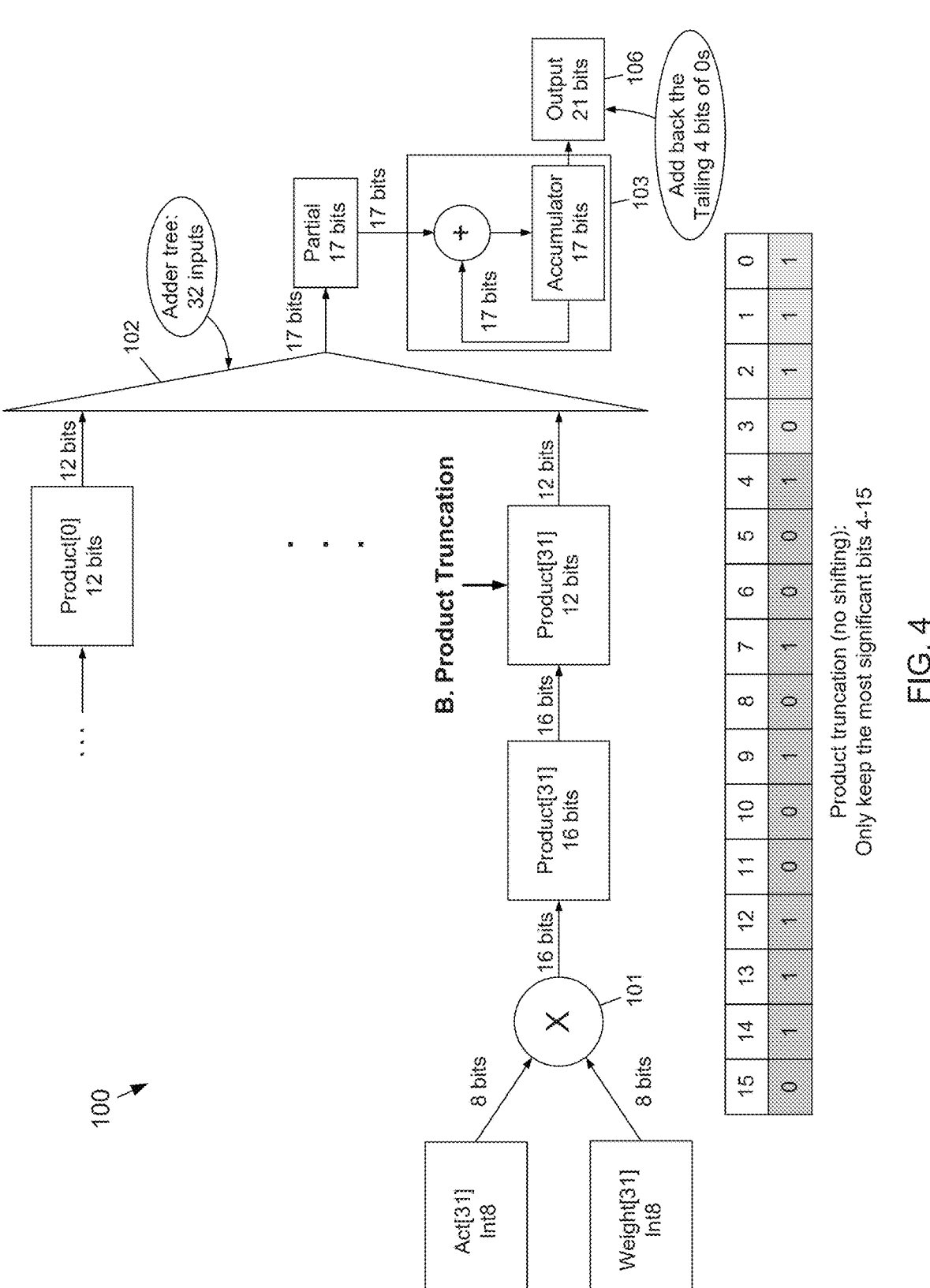
FIG. 4 depicts the portion of the example embodiment of the neural network accelerator in which data truncation (Product Truncation) is applied at the output of a multiplier according to the subject disclosed herein.

FIG. 4 depicts the portion of the example embodiment of the neural network accelerator 100 in which data truncation (Product Truncation) is applied at the output of a multiplier according to the subject disclosed herein. For Product Truncation, the four least-significant bits of each product value is truncated, so that, for example, 16-bit product values are reduced to be 12-bit product values.

An example 16-bit product value is shown at the bottom of FIG. 4. The 16-bit activation is truncated to keep the 12 most-significant bits. Although 16-bit activation is truncated to keep the 12 most-significant bits, other compression/truncation schemes may alternatively be used. Moreover, the number of bits compressed/truncated may also be flexible based on an application and/or requirements. The truncation of the activation value is independent of which bit is the bit having the most-significant bit value. The reduction in bit width of the product values provides a narrower data path between the multipliers 101 and the adder tree 102. For the example truncation embodiment depicted in FIG. 4, reducing the width of the data path reduces the number of conductors, or wires, between the multipliers and the adder tree by 128 conductors, which may be a significant space savings.

To compensate for the reduced absolute magnitude value of the product values as a result of the truncation of the product values, a register 106 adds the four least significant bits back to the accumulator value to form a 21-bit output.

Figure 5:
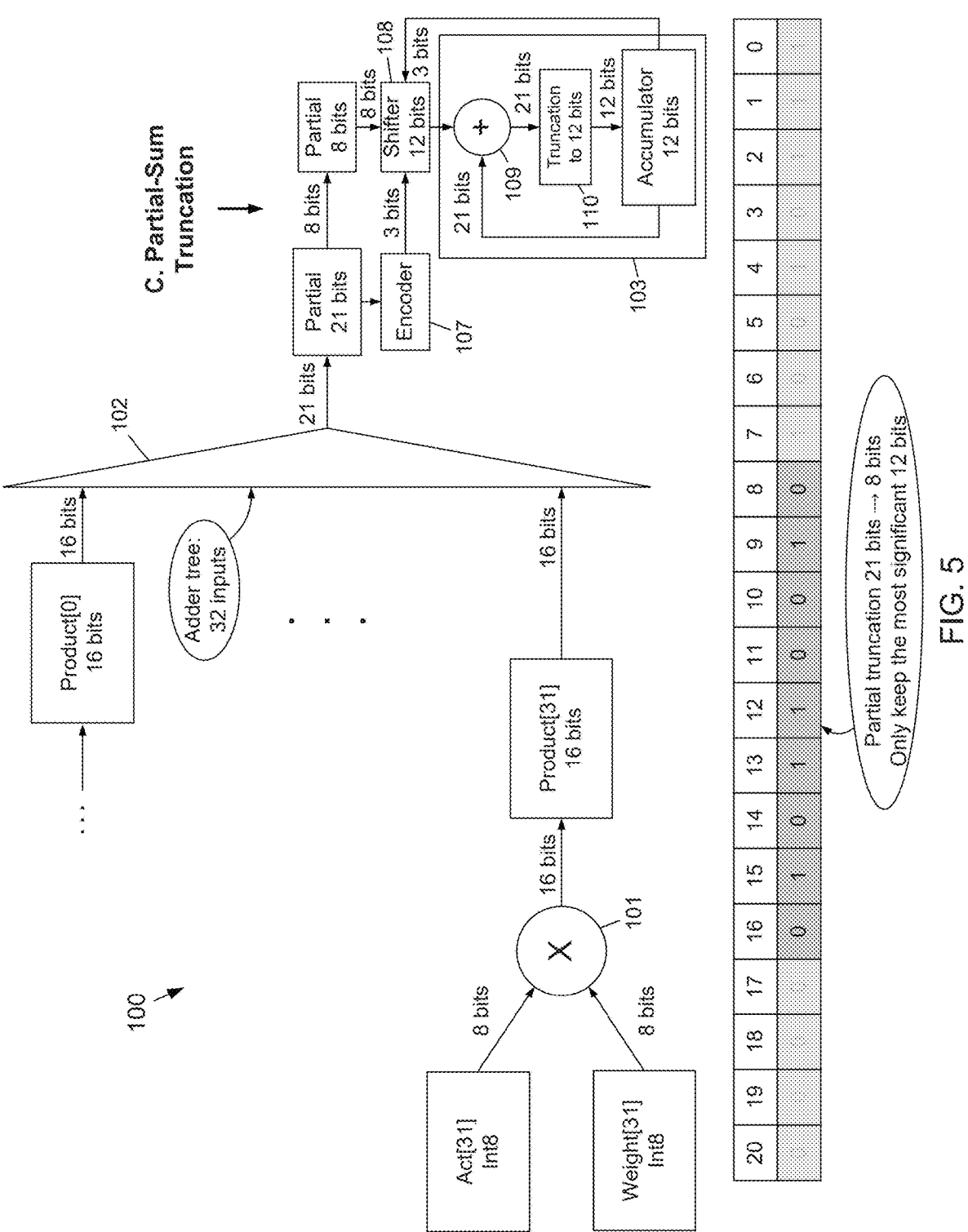
FIG. 5 depicts the portion of the example embodiment of the neural network accelerator in which data truncation (Partial-Sum Truncation) is applied at the partial sums according to the subject disclosed herein.

FIG. 5 depicts the portion of the example embodiment of the neural network accelerator 100 in which data truncation (Partial-Sum Truncation) is applied at the partial sums according to the subject disclosed herein. For Partial-Sum Truncation, the output of the adder tree 102 is truncated to keep the eight (8) most-significant bits of a partial sum.

An example 21-bit partial sum value is shown at the bottom of FIG. 5. The 21-bit partial sum value is truncated to keep the eight most-significant bits. The eight bits that are kept depends on the position of the most significant bit of the partial sum value. The eight most-significant bits of the example 21-bit value are in bits 15 to 8, so the bits that are kept begin at bit 15. Other partial sum values may have the most significant bit in any of the bit positions. The eight bits of a partial sum that are kept may be stored in a memory having a reduced footprint size.

An encoder 107 keeps track of the position of the most significant bit of a truncated partial-sum value using a 3-bit value. A shifter 108 receives the three bits output from the encoder 107 and a 3-bit value from the accumulator 103 to correctly left shift the partial-sum value so that the partial-sum value may be properly accumulated. A 21-bit adder 109 adds the partial-sum value to the accumulator value, which is then compressed/truncated at 110 to be a 12-bit value.

In a brief summary, when Multiplier Truncation is provided at the inputs of the multipliers, computation is saved, but at the price of the additional overhead associated with an encoder and shifter per multiplier and some possible accuracy loss. The accuracy may be recovered based on fine tuning of truncated activation and/or weight values. When Product Truncation is provided at the output of the multipliers, a reduced width critical data path may be obtained with a small overhead of adding the truncated tailing bits to the output of the accumulator. When Partial-Sum Truncation is provided at the partial sum value, a reduction in memory footprint space may be achieved and accuracy may be preserved without fine tuning.

Table 1 below shows the accuracy of an example neural network using the different truncation techniques disclosed herein as compared to an example ResNet50 neural network model. The example ResNet50 neural network model exhibited an accuracy of 76.012 for a 32-bit floating point (FP32) data format. An INT8 data format respectively provided an accuracy of 75.95 and 75.996. Accuracy for Multiplier Truncation are shown for a 4-bit activation×4-bit weight truncation configuration, a 4-bit activation truncation configuration and a 4-bit weight truncation configuration. Accuracy for three different Product Truncation configurations and for three different Partial-Sum Truncations are shown.

TABLE 1

| ResNet50 | Top-1 |
|---|---|
| FP32 | 76.012 |
| INT8 (exact) | 75.996 |
| 4b activation x 4b weight | 75.112 |
| 4b activation | 75.62 |
| 4b weight | 75.882 |
| Product 13b | 75.986 |
| Product 12b | 75.906 |
| Product 10b | 74.636 |
| Partial: P14M10 | 76.032 |
| Partial: P12M8 | 76.012 |
| Partial: P11M7 | 75.908 |

The partial-compression techniques disclosed herein may also be used for segmentation and may provide comparable performance accuracy to non-partial-compression techniques.

Figure 6:
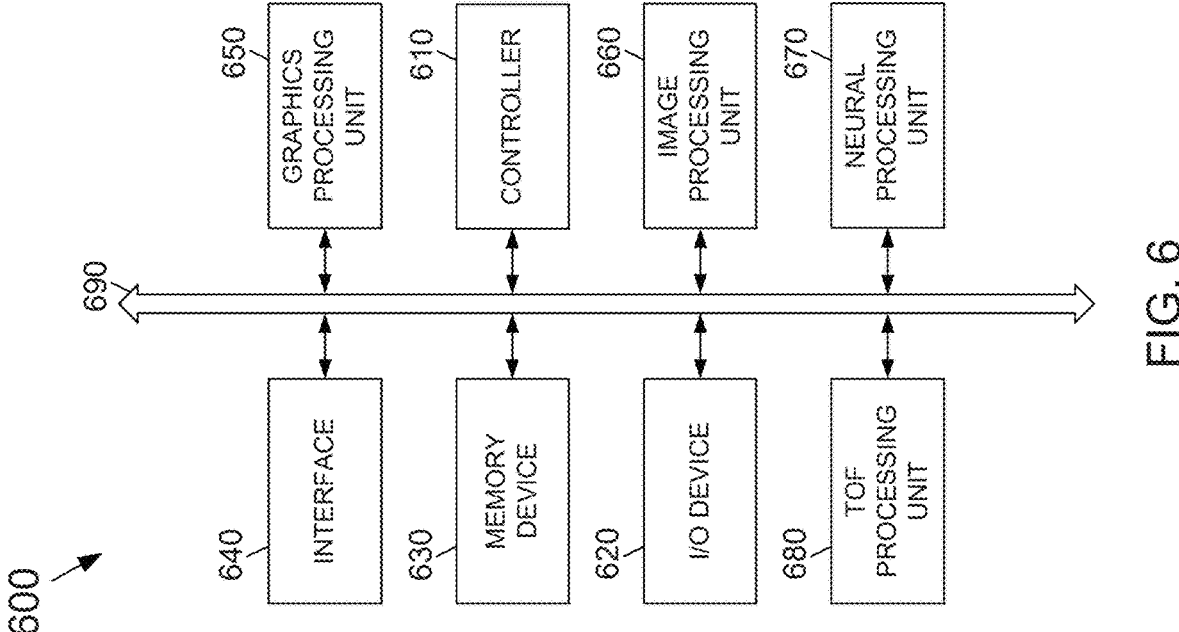
FIG. 6 depicts an electronic device that includes a virtual training system according to the subject matter disclosed herein.

FIG. 6 depicts an electronic device 600 that includes a neural network accelerator having partial compression (truncation) at different locations in the neural network accelerator according to the subject matter disclosed herein. The electronic device 600 may include a controller (or CPU) 610, an input/output device 620 such as, but not limited to, a keypad, a keyboard, a display, a touch-screen display, a 2D image sensor, a 3D image sensor, a memory 630, an interface 640, a GPU 650, an imaging-processing unit 660, a neural processing unit 670, a TOF processing unit 680 that are coupled to each other through a bus 690. The controller 610 may include, for example, at least one microprocessor, at least one digital signal processor, at least one microcontroller, or the like. The memory 630 may be configured to store a command code to be used by the controller 610 and/or to store a user data. At least one of the image-processing unit 660 or the neural processing unit 670 includes a neural network accelerator having partial compression (truncation) at different locations in the neural network accelerator according to the subject matter disclosed herein.

Electronic device 600 and the various system components of electronic device 600 may be formed from one or modules. The interface 640 may be configured to include a wireless interface that is configured to transmit data to or receive data from, for example, a wireless communication network using a RF signal. The wireless interface 640 may include, for example, an antenna. The electronic system 600 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), Fifth-Generation Wireless (5G), Sixth-Generation Wireless (6G), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A neural network accelerator, comprising:
   $2^n$ multiplier circuits, each respective multiplier circuit being configured to multiply a corresponding first value by a corresponding second value to output a corresponding first product value in which n comprises an integer, each respective first value being represented by a first predetermined number of bits beginning at a most significant bit of the first value having a value equal to 1, each respective second value being represented by a second predetermined number of bits, and each respective first product value being represented by a third predetermined number of bits;
   $2^n$ shifter circuits, each respective shifter circuit being configured to receive the first product value of a corresponding multiplier circuit and to left shift the first corresponding product value by the first predetermined number of bits to form a respective second product value; and
   an adder circuit configured to add each respective second product value to form a partial-sum value represented by a fourth predetermined number of bits.

2. The neural network accelerator of claim 1, wherein each respective second value being further represented by the second predetermined number of bits beginning at a most significant bit of the second value having a value equal to 1, and
   wherein each respective shifter circuit further configured to left shift the first corresponding product value by a first number equal to the first predetermined number of bits plus a second number equal to the second predetermined number of bits to form the respective second product value.

3. The neural network accelerator of claim 2, wherein n equals 5, the first predetermined number of bits equals 4 bits, the second predetermined number of bits equals 4 bits, the third predetermined number of bits equals 8 bits, and the fourth predetermined number of bits equals 21 bits.

4. The neural network accelerator of claim 1, wherein n equals 5, the first predetermined number of bits equals 4 bits, the second predetermined number of bits equals 8 bits, the third predetermined number of bits equals 12 bits, and the fourth predetermined number of bits equals 21 bits.

5. The neural network accelerator of claim 1, further comprising an accumulator configured to accumulate the partial-sum value with other partial-sum values to form a final sum value.

6. The neural network accelerator of claim 1, wherein the adder circuit comprises an adder tree circuit.

7. The neural network accelerator of claim 1, wherein the corresponding first value comprises an activation value and the corresponding second value comprises a weight value.

8. The neural network accelerator of claim 1, wherein at least one of the corresponding first value or the corresponding second value comprises a truncated value.

9. The neural network accelerator of claim 1, wherein the corresponding first product value comprises a truncated value.

10. A method comprising:
   outputting, by each of $2^n$ multiplier circuits wherein n comprises an integer, a corresponding first product value, each respective multiplier circuit being configured to multiply a corresponding first value by a corresponding second value to output the corresponding first product value, each respective first value being represented by a first predetermined number of bits beginning at a most significant bit of the first value having a value equal to 1, each respective second value being represented by a second predetermined number of bits, and each respective first product value being represented by a third predetermined number of bits;
   receiving, by each of $2^n$ shifter circuits, the first product value of a corresponding multiplier circuit, each respective shifter circuit being configured to left shift the first corresponding product value by the first predetermined number of bits to form a respective second product value; and
   forming, by an adder circuit configured to add each respective second product value, a partial-sum value represented by a fourth predetermined number of bits.

11. The method of claim 10, wherein each respective second value being further represented by the second predetermined number of bits beginning at a most significant bit of the second value having a value equal to 1, and
   wherein each respective shifter circuit further configured to left shift the first corresponding product value by a first number equal to the first predetermined number of bits plus a second number equal to the second predetermined number of bits to form the respective second product value.

12. The method of claim 11, wherein n equals 5, the first predetermined number of bits equals 4 bits, the second predetermined number of bits equals 4 bits, the third predetermined number of bits equals 8 bits, and the fourth predetermined number of bits equals 21 bits.

13. The method of claim 10, further comprising:
   accumulating the partial-sum value with other partial-sum values; and
   forming a final sum value based on accumulating the partial-sum value with the other partial-sum values.

14. The method of claim 10, wherein the adder circuit comprises an adder tree circuit.

15. The method of claim 10, wherein the corresponding first value comprises an activation value and the corresponding second value comprises a weight value.

16. The method of claim 10, wherein at least one of the corresponding first value or the corresponding second value comprises a truncated value.

17. The method of claim 10, wherein the corresponding first product value comprises a truncated value.

18. A system comprising:
   a neural network; and
   a neural network accelerator comprising:
      $2^n$ multiplier circuits, each respective multiplier circuit being configured to multiply a corresponding first value by a corresponding second value to output a corresponding first product value in which n comprises an integer, each respective first value being represented by a first predetermined number of bits beginning at a most significant bit of the first value having a value equal to 1, each respective second value being represented by a second predetermined number of bits, and each respective first product value being represented by a third predetermined number of bits;
      $2^n$ shifter circuits, each respective shifter circuit being configured to receive the first product value of a corresponding multiplier circuit and to left shift the first corresponding product value by the first predetermined number of bits to form a respective second product value; and
      an adder circuit configured to add each respective second product value to form a partial-sum value represented by a fourth predetermined number of bits.

19. The system of claim 18, wherein each respective second value being further represented by the second predetermined number of bits beginning at a most significant bit of the second value having a value equal to 1, and
   wherein each respective shifter circuit further configured to left shift the first corresponding product value by a first number equal to the first predetermined number of bits plus a second number equal to the second predetermined number of bits to form the respective second product value.

20. The system of claim 19, wherein n equals 5, the first predetermined number of bits equals 4 bits, the second predetermined number of bits equals 4 bits, the third predetermined number of bits equals 8 bits, and the fourth predetermined number of bits equals 21 bits.

* * * * *